US006633879B1

(12) United States Patent
Jeffries

(10) Patent No.: US 6,633,879 B1
(45) Date of Patent: Oct. 14, 2003

(54) METHOD AND SYSTEM FOR OPTIMIZING DIRECT TABLES AND TREES

(75) Inventor: Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,517

(22) Filed: Jan. 4, 2000

(51) Int. Cl.$^7$ .............................................. G06F 17/30
(52) U.S. Cl. ............................ 707/100; 707/1; 707/10; 707/200; 707/509
(58) Field of Search .................. 707/1–6, 10, 100, 707/101, 200, 202, 205, 509, 7, 203, 504; 706/26, 41; 711/119, 202, 203, 216; 370/392, 397

(56) References Cited

U.S. PATENT DOCUMENTS

| | | | | |
|---|---|---|---|---|
| 4,918,614 A | * | 4/1990 | Modarres et al. .............. 716/10 |
| 5,230,040 A | * | 7/1993 | Yamashita .................. 144/24.1 |
| 5,295,256 A | * | 3/1994 | Bapat ............................. 707/3 |
| 5,555,405 A | * | 9/1996 | Griesmer et al. ............ 370/401 |
| 5,617,567 A | * | 4/1997 | Doktor ........................... 707/2 |
| 5,644,763 A | | 7/1997 | Roy ............................ 707/101 |
| 5,706,462 A | | 1/1998 | Matousek .................... 711/118 |
| 5,724,512 A | * | 3/1998 | Winterbottom ............. 709/226 |
| 5,745,904 A | * | 4/1998 | King et al. .................. 707/200 |
| 5,774,121 A | * | 6/1998 | Stiegler ...................... 345/769 |
| 5,774,739 A | | 6/1998 | Angle et al. .................. 712/34 |
| 5,809,499 A | * | 9/1998 | Wong et al. ............. 178/18.01 |
| 5,815,737 A | * | 9/1998 | Buckland ............... 370/395.32 |
| 5,893,087 A | | 4/1999 | Wlaschin et al. .............. 707/3 |
| 5,918,225 A | * | 6/1999 | White et al. .................... 707/1 |
| 5,935,235 A | | 8/1999 | Angle et al. .................. 712/34 |
| 6,009,421 A | * | 12/1999 | Xie et al. ...................... 706/61 |
| 6,044,383 A | * | 3/2000 | Suzuki et al. ................ 707/509 |
| 6,065,008 A | * | 5/2000 | Simon et al. .................. 707/10 |
| 6,073,140 A | * | 6/2000 | Morgan et al. ............. 707/203 |
| 6,115,802 A | * | 9/2000 | Tock et al. ...................... 707/1 |
| 6,138,117 A | * | 10/2000 | Bayardo ...................... 707/101 |
| 6,212,526 B1 | * | 4/2001 | Chaudhuri et al. .......... 707/100 |
| 6,223,270 B1 | * | 4/2001 | Chesson et al. ............. 711/202 |
| 6,249,521 B1 | * | 6/2001 | Kerstein ...................... 370/389 |
| 6,301,579 B1 | * | 10/2001 | Becker ........................ 345/440 |
| 6,449,613 B1 | * | 9/2002 | Egolf et al. ...................... 707/7 |

OTHER PUBLICATIONS

Parhami, Behrooz, "Analysis of the Lookup Table Size for Square–Rooting", Conference Record of the Thirty–Third Asilomar Conference on Signals, Systems, and Computers, Oct. 24–27, 1999, vol. 2, pp. 1327–1330.*

"HTML Table Width," WordPerfect 8 Internet Publisher Tip Series, Dec. 16, 1998, pp. 1–3.

"Creating Your Screen Layout Using Tables," Innovative Technologies Collabrative, Mar. 10, 1999, pp. 1–2.

"Saint Michael's Library and Information Services," Jul. 14, 1998, pp. 1–4.

* cited by examiner

*Primary Examiner*—Shahid Al Alam
(74) *Attorney, Agent, or Firm*—Sawyer Law Group

(57) ABSTRACT

A method and system for selecting a direct table and a plurality of corresponding trees in a computer system is disclosed. The method and system include selecting a plurality of widths for the direct table and probabilistically determining at least one desired property of the direct table and the plurality of corresponding trees for the plurality of widths. The method and system also include selecting a width of the plurality of widths for the direct table and the plurality of corresponding trees based on the at least one desired property of the direct table and the plurality of corresponding trees.

14 Claims, 5 Drawing Sheets

METHOD AND SYSTEM FOR OPTIMIZING DIRECT TABLES AND TREES

FIELD OF THE INVENTION

The present invention relates to computer systems and more particularly to a method and system for optimizing the combination of a direct table and trees for storing data.

BACKGROUND OF THE INVENTION

Currently, direct tables and decision trees are utilized for searching for and accessing information, or items, in computer systems. For example, a large number of items may be desired to be stored. The items may be identified by a key, which is typically a binary number string of a particular length. Based on the key, information is desired to be obtained from the table. For example, the key might indicate a particular piece of data or that a specific action is to be taken.

If a direct table is used alone, without a tree, the direct table would typically have an entry for each unique value of the key. However, the key is typically several digits long. For example, one conventional key might be one hundred and ninety-two bits long. In order to ensure that a unique entry exists for every possible value of the key, the direct table would need to contain $2^{192}$ entries. Such a direct table is too large to be practical.

Thus, a smaller direct table utilizing a shorter key, which will be termed a hash value, is typically used. The smaller key is termed a hash value because the key is typically hashed in order to obtain the shorter key. Thus, in order to obtain the hash value, the key is operated on by a hash function. The hash function combines or otherwise operates on the digits of a particular value of the key in order to obtain a hash value which may be unique to that value of the key. In general, it is desired that the hash value be a random hash of the key in order to avoid tying the hash value to closely to specific information related to the key. However, no specific hash function is required.

The direct table typically has an entry for each unique hash value. Because the hash value can be significantly shorter than the key, the direct table can be significantly smaller than a direct table for the key. For example, a key which is ninety-two bits long may be hashed to hash values which are on the order of ten bits long. A direct table for a hash value having a ten-bit length need only have $2^{10}$, or 1024, entries. The width of such a direct table is defined by the length of the hash value. Thus, a direct table using a ten-bit hash value is ten bits wide.

There can be more items to be stored in the direct table using the hash value or key than there are entries in the direct table. This is true for a direct table having a width, W, for which $2^W$ is less than the number of items to be stored or if the same hash value is selected for different keys. Consequently, a plurality of items may reside in the same entry and be described by the same hash value. If a search is carried out based on the hash value only, the computer system may be unable to provide a unique decision or item for a hash. value. Such a situation is known as a collision. A double collision in which two items correspond to the same hash value, a triple collision in which three items correspond to the same hash value, or a higher order collision may occur. In order to resolve these collisions, a tree is utilized in conjunction with the direct table. Note that the same is true when a key is used in lieu of a hash value and $2^W$ is less than the number of items to be stored or if more than one item can correspond to the same key.

A tree provides a mechanism for obtaining additional information and making decisions based on the information in order to uniquely identify the item desired to be found. For example, the tree might utilize additional bits from the key. Based on the additional information, the tree makes a decision at a node between two paths. Each piece of additional information utilized corresponds to a node. The items which collide are stored at the leaves of the tree at the end of a particular decision path through the tree. Thus, the combination of the direct table and the tree can be used to search for each of the items.

FIG. 1, for example depicts a direct table 10 and corresponding decision trees. However, for the purposes of clarity, only decision trees 50 and 60 are labeled and discussed. In addition, the number and size of the corresponding trees for the direct table 10 is for explanation only and not meant to represent a particular preferred distribution. The direct table 10 is four bits wide, corresponding to a hash value or key of 4 bits. The direct table 10 thus has sixteen entries 12, 14, 16, 18, 20, 22, 24, 26, 28, 30, 32, 34, 36, 38, 40 and 42. Suppose, however, that up to twenty-four items are desired to be found using the direct table 10 and trees 50 and 60. Because there are more items than entries 12, 14, 16, 18, 20, 22, 24, 26, 28, 30, 32, 34, 36, 38, 40 and 42, at least one of the entries 12, 14, 16, 18, 20, 22, 24, 26, 28, 30, 32, 34, 36, 38, 40 and 42 corresponds to more than one item. For example, entries 16, 20, 26, 36 and 40 correspond to no items. Entries 12, 22, 32 and 34 correspond to a single item. Entries 14 and 28 correspond to two items. Entries 24, 30 and 42 correspond to three items. Entry 18 and entry 38 correspond to four items. Thus, there is a quadruple collision for the entry 18.

Where an entry corresponds to more than one item, a decision tree is used, for example, in order to uniquely identify an item corresponding to the entry 18 and the entry 38, a tree 50 and 60, respectively, will be used. Note that only a single tree corresponds to a particular collision. Because four items correspond to the entry 18 and the entry 38, the trees 50 and 50 each have four leaves 54, 55, 56, 57 and 64, 65, 66, and 67, respectively, which correspond to the four items. Depending upon the additional information for the four items used by the trees 50 and 60, the items may be more difficult to identify. For example, the tree 50 makes a decision at node 51 corresponding to a first piece of information. The decision at node 51 leads to node 52 or 53. Another piece of information obtained for either node 52 or node 53 leads to one of the leaves 54, 55, 56, or 57 and, therefore, to the item desired. Thus, two decisions, one at node 51 and another at either node 52 or node 53, lead to the item. In contrast, for the tree 60 that corresponds to the four items stored in the entry 38, up to three pieces of information may be required to uniquely identify the item corresponding to the leaf 67. Thus, a first piece of information will result either in the item corresponding to node 64 being found or in a decision requiring a second piece of information at node 62. The second piece of information will lead either to the item corresponding to node 65 being found or to a decision requiring a third piece of information at the node 63. The third piece of information will lead either to the item corresponding to the leaf 66 or to the item corresponding to the leaf 67. Thus, the tree 50 and the tree 60 can be used to resolve the collision at the entry 18 and the entry 38, respectively.

Thus, using the direction table 10 and the corresponding trees, such as the trees 50 or 60, items can be uniquely identified. A wider direct table contains more entries and, therefore, can be used to uniquely identify a larger number of items. In other words, for a given number of items, a wider direct table will result in fewer collisions. Where more than one item can correspond to the same entry in a direct table, however, trees are utilized to resolve collisions.

Direct tables and trees each have different costs associated with them. For example, a direct table may require a first amount of memory for an entry. A tree may require a different amount of memory for a node. Similarly, it may take a different amount of time to find an item stored in an entry of a direct table than to find an item corresponding to a particular leaf on a particular tree. Thus, different combinations of the direct table and trees may be used to meet system requirements for space and speed. A designer must thus be able to select the direct table and trees which will meet the desired requirements.

FIG. 2 depicts a conventional method 70 for selecting the size of the direct table and the trees. The width of the direct table is selected, via step 72. The corresponding trees are determined, via step 74. It is then determined whether the direct table and corresponding trees perform within the desired parameters. If so, then the designers work is complete. If not, then step 72 is again performed and the method 70 repeats.

Although the method 70 functions, one of ordinary skill in the art will readily realize that the method 70 essentially relies on trial and error. Consequently, the method 70 may take a relatively long time and may require a highly skilled designer. Furthermore, the method 70 may result in a combination of a direct table and trees which, although meeting system requirements, is far from optimal.

Accordingly, what is needed is a system and method for providing a combination of a direct table and a tree which is better able to optimize the desired properties of the direct table and tree. The present invention addresses such a need.

SUMMARY OF THE INVENTION

A method and system for selecting a direct table and a plurality of corresponding trees in a computer system is disclosed. The method and system comprise selecting a plurality of widths for the direct table and probabilistically determining at least one desired property of the direct table and the plurality of corresponding trees for the plurality of widths. The method and system also comprise selecting a width of the plurality of widths for the direct table and the plurality of corresponding trees based on the at least one desired property of the direct table and the plurality of corresponding trees.

According to the system and method disclosed herein, the present invention provides a relatively simple mechanism for selecting the optimal width of the direct table and the corresponding plurality of trees.

DETAILED DESCRIPTION OF THE INVENTION

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Direct tables and trees have wide use in computer systems for searching for information or making decisions. Conventional methods for selecting the direct table and corresponding trees utilize trial and error. However, one of ordinary skill in the art will readily realize that such methods may be time consuming and result in poorer performance than could be obtained.

A method and system for selecting a direct table and a plurality of corresponding trees in a computer system is disclosed. The method and system comprise selecting a plurality of widths for the direct table and probabilistically determining at least one desired property of the direct table and the plurality of corresponding trees for the plurality of widths. The method and system also comprise selecting a width of the plurality of widths for the direct table and the plurality of corresponding trees based on the at least one desired property of the direct table and the plurality of corresponding trees.

The present invention will be described in terms of a particular system, particular components and certain costs. However, one of ordinary skill in the art will readily recognize that this method and system will operate effectively for other components in a computer network having other costs. Furthermore, the present invention will be described in terms of specific desired properties. However, one of ordinary skill in the art will readily realize that other properties can be optimized using the present invention. The present invention is also preferably implemented manually, using a spreadsheet. However, nothing prevents the method and system from being implemented by apparatus such as a computer system.

Figure 3:
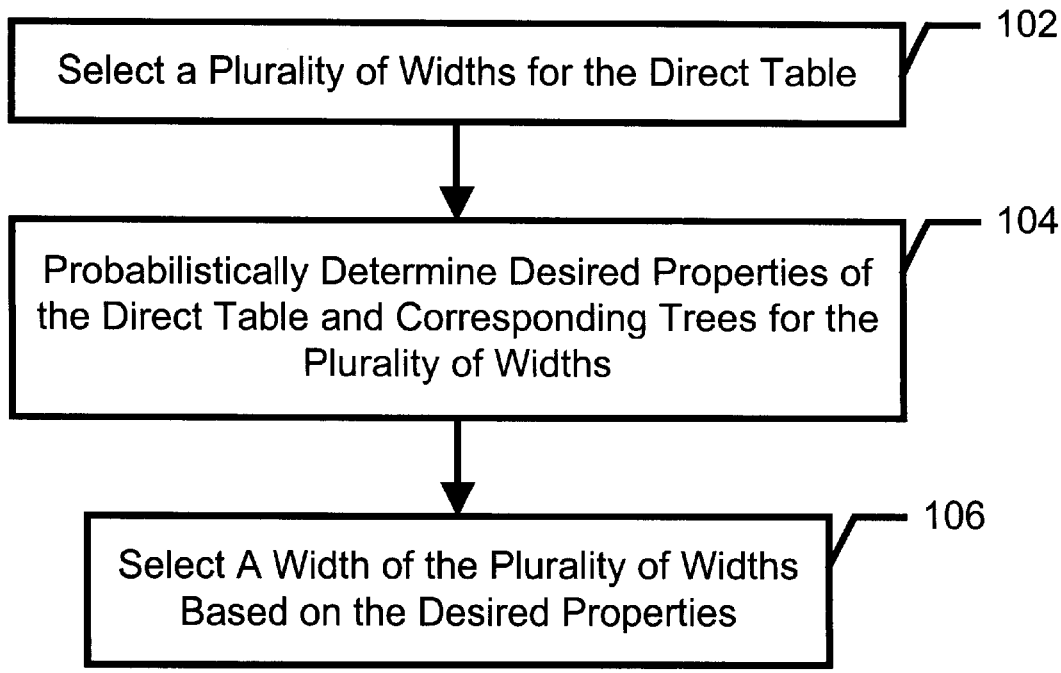
FIG. 3 is a flow chart depicting a method in accordance with the present invention for determining a direct table and the corresponding trees.

To more particularly illustrate the method and system in accordance with the present invention, refer now to FIG. 3, depicting one embodiment of a method 100 in accordance with the present invention. The method 100 results in a system for searching for items including a direct table and corresponding trees, such as the direct table 10 and corresponding trees 50 and 60. However, the method 100 can result in better selection for properties such as the width of the direct table 10. A plurality of widths is selected for the direct table, via step 102. These widths are potential widths for the direct table. A property or properties of the direct table and corresponding trees are probabilistically determined for the plurality of widths, via step 104. The property determined is preferably a property or properties which the designer is interested in optimizing. For example, in one embodiment, the property of interest is the cost of the direct table and trees in terms of the number of bits utilized. In another embodiment, the property of interest is the speed at which the direct table and corresponding trees can find an item. In yet another embodiment, the properties of interest may be a combination of the cost and speed. A width for the direct table is selected from the plurality of widths based on the property or properties that were probabilistically determined, via step 106. Thus, a designer can select the width which optimizes the desired properties. The direct table having the desired width and the corresponding trees can then be built. Note that if the optimal width is not among the plurality of widths selected in step 102, steps 102–104 of the method 100 can be repeated until and optimal width is determined. Once the width is selected using the step 106, the desired direct table and corresponding trees can be built.

Figure 2:
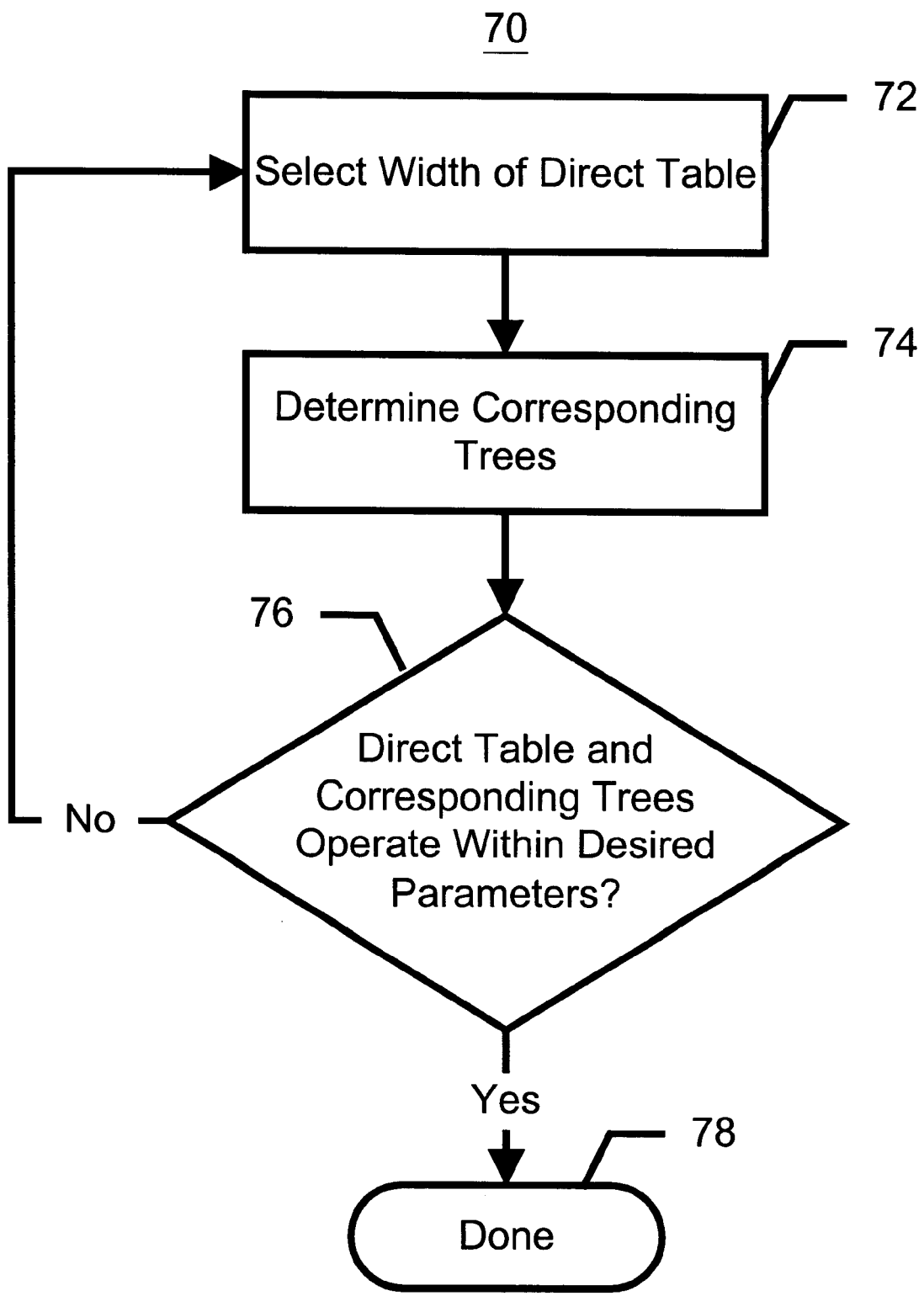
FIG. 2 is a flow-chart depicting a conventional method for selecting a direct table and trees.

The method 100 can more rapidly and easily determine the optimal direct table and corresponding trees. The method 100 can accomplish this because the method 100 probabilistically calculates the properties of the direct table and corresponding trees prior to building the direct table and corresponding trees. The trial and error of the conventional method 70, depicted in FIG. 2, is avoided. The method 100 of FIG. 3, therefore, facilitates the design of the direct table and corresponding trees.

Calculation of properties of the direct table and corresponding trees is often possible. For example, suppose a random hash function is used to place N items in M entries of a direct table. It is presumed that both N and M are greater than 1. As discussed above, the width of a direct table, W, is given by $\log_2(M)$ because $2^W$ must be M. The probability that one of the items is in a particular entry is $1/M$. Furthermore, the probability that another item also corresponds to the entry is $1/M$. The probability that another item is not in the bin is, therefore, $1-1/M$. Consequently, the expected value of the number of items sharing the same entry as the first item is $\Sigma(1/M)$ over $(N-1)$ items. The expected value of the number of items sharing the same entry as the first item is, therefore, $(N-1)/M$. The probability that no other items share the same entry is $(1-1/M)^{N-1}$, assuming that $0^0=1$.

Furthermore, the probability that a particular item has a certain number of neighbors sharing the same entry can be calculated probabilistically. Assume that $C(a,b)=a!/\{b!(a-b)!\}$, with the convention that $C(0,0)=0$. Of the N items, one is selected at random. There are $C(N-1,j)$ ways to choose j other items, where $N-1$ is greater than j and j is greater than zero. Thus, the probability that exactly j items share the same entry as the item selected at random, i.e. that $j+1$ items collide, is given by:

$$P(j)=C(N-1,j)*(1/M)^j*(1-1/M)^{N-1-j}$$

Where:
P(j)=probability that an item selected at random has exactly j neighbors in the same entry Thus, the expected value of the number of items having j neighbors, EV(j), is:

$$EV(j)=N*C(N-1,j)*(1/M)^j*(1-1/M)^{N-1-j}$$

The expected value is basically the average value of the number of items having j neighbors as tabulated from many experiments with random assignments of N items to M direct table entries.

Based on this expected value, the number of items which collide can be calculated probabilistically. Thus, the number of single, double, triple, and other collisions can be calculated. All that is needed to be known is the number of items desired to be stored and the width of the direct table. From the number and type of collisions calculated, the type of trees corresponding to a table of a given width can be calculated. Thus, the desired properties of the direct table and corresponding trees can be calculated and selected to be their desired values.

In one preferred embodiment, the method 100 is used to optimize the cost of the direct table and corresponding trees.

Figure 4A:
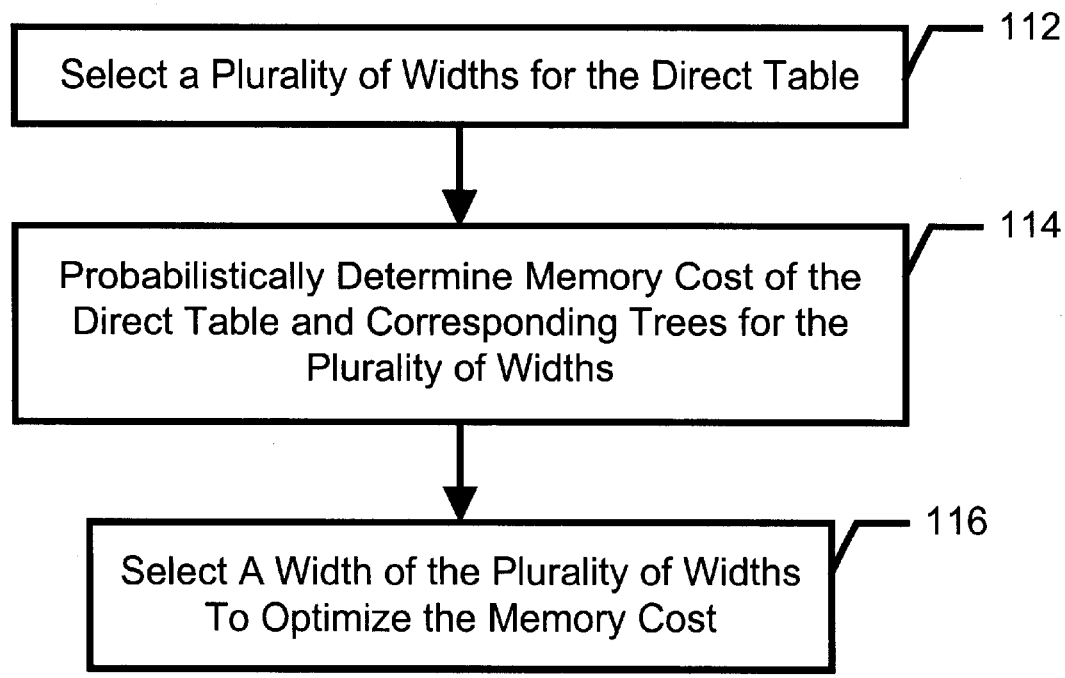
FIG. 4A is a flow chart depicting a method in accordance with the present invention for optimizing the cost of a direct table and the corresponding trees.

FIG. 4A depicts a method 110 for optimizing the cost, in terms of the number of bits used, for the direct table and corresponding trees. A plurality of widths for the direct table is selected, via step 112. The cost of the direct table and the corresponding plurality of trees is calculated for each or the plurality of widths, via step 114. In a preferred embodiment, the cost of a direct table and the corresponding plurality of trees is given by:

$$\begin{aligned}C_{total} &= \text{cost of direct table} + \text{cost of corresponding trees} \\ &= \text{cost of direct table} + \text{cost of tree nodes} + \\ &\quad \text{cost of tree leaves} \\ &= (\text{cost per direct table bit})*W*2^W) + (\text{cost per node})* \\ &\quad (\text{number of nodes}) + (\text{cost per leaf})*(\text{number of leaves})\end{aligned}$$

Note that the number of nodes for the corresponding trees is one less than the number of leaves. Furthermore, the cost of the tree leaves does not change with width because the number of leaves and cost per leaf typically do not change as the width of the direct table changes. Consequently, instead of the total cost listed above, a different total cost can be used. This total cost is varies with the width and is given by:

$C_{total}$=cost of direct table+cost of tree nodes+cost of tree leaves= (cost per direct table bit)*$W*2^W$)+(cost per node)*(number of nodes)+constant The width of the plurality of widths which optimizes the cost is then selected, via step 116. Note that if the optimal width was not among the plurality of widths selected in step 112, then steps 112 and 114 may be repeated. Using the width selected in step 116, the direct table and corresponding trees having the optimal width can be determined. Once the width is selected using the step 116, the desired direct table and corresponding trees can be built.

Figure 4B:
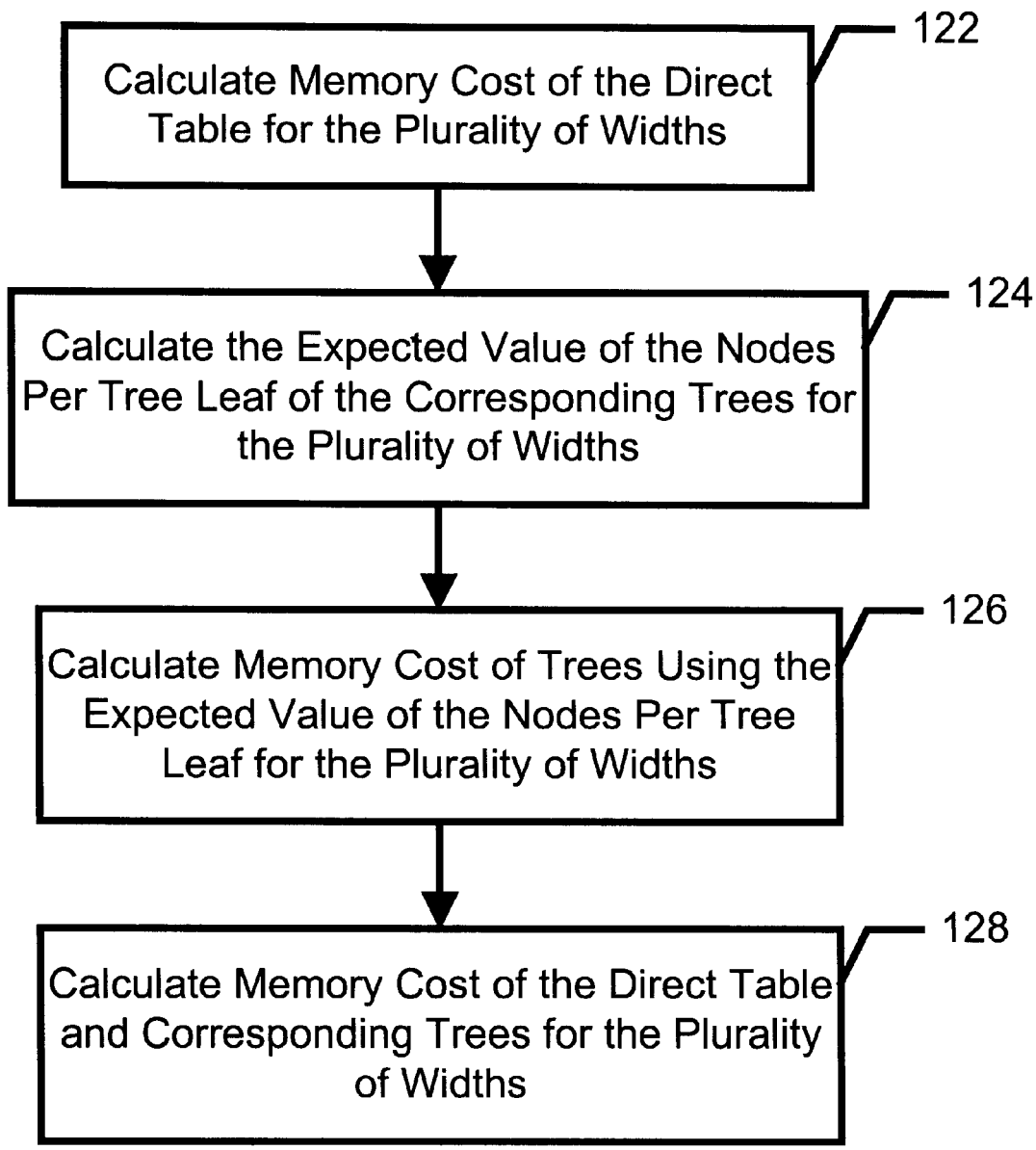
FIG. 4B is a more detailed flow chart depicting a method in accordance with the present invention for calculating the cost of a direct table and corresponding trees.

FIG. 4B depicts a preferred embodiment of a method for performing step 114, determining the cost of the direct table for a plurality of widths. The cost of the direct table is calculated for the plurality of widths, via step 122. Typically, the cost of a direct table is the width of a direct table multiplied by the number of entries of the direct table, multiplied by the cost per direct table bit. In one embodiment, the cost per bit of direct table storage is one bit. The number of entries for a direct table is two to the power W, where W is the width of the direct table. For example, for a width of twelve bits, the cost of the direct table is:

$C_{table}=12*2^{12}*$ 1 bit=49, 152 bits

The cost of the corresponding trees is also calculated using steps 124 and 126. The expected value of the number of tree nodes is calculated, via step 124. In order to calculate the expected value of the number of tree nodes, the following analysis is used. First, the probability that a random item has exactly j neighbors, where j is greater than or equal to zero, is:

$$p(j)=C(N-1,j)*(1/M)^j*(1-1/M)^{(N-1-j)}$$

Thus for N greater than or equal to two, the expected number of items colliding in groups of exactly k, with k greater than or equal to one and less than or equal to N, is:

$$Col(k)=N*p(k-1)$$

where:
Col(k)=expected number of items colliding in groups of exactly k

Thus the expected number of colliding groups of exactly k items, where k is greater than or equal to one, is:

$$G(k) = N * p(k-1)/k$$

where:
G(k)=expected number of colliding groups of exactly k items

The number of tree nodes (branches) for a group of exactly k colliding items, where k is greater than or equal to one, is k−1. Thus, the expected total number of tree nodes is:

$$EV_{nodes} = \sum_{k=2}^{N} N * p(k-1) * (k-1)/k$$

$$= \sum_{j=1}^{N-1} j * C(N, j+1) * (1/M)^j * (1-1/M)^{N-j-1}$$

Using the expected value of the number of nodes for the corresponding trees, the cost of the corresponding trees is calculated, via step 126. Thus, the expected cost of the corresponding trees is calculated using this expected value of the number of tree nodes and the number of leaves as follows:

$$C_{trees} = EV_{nodes} * (\text{cost of bits/node}) +$$

$$(\text{number of leaves}) * (\text{cost of bits per leaf})$$

$$= \sum_{j=1}^{N-1} j * C(N, j+1) * (1/M)^j * (1-1/M)^{N-j-1} *$$

$$(\text{cost of bits/node}) + N * (\text{cost of bits/leaf})$$

As discussed above, the cost per leaf multiplied by the number of leaves is constant for a given number of items to be stored. In other words, only the cost of the tree nodes varies with the width of the direct table. Consequently, if desired the cost of the tree calculated in step 126 could be given by:

$$C_{trees} =$$

$$\sum_{j=1}^{N-1} j * C(N, j+1) * (1/M)^j * (1-1/M)^{N-j-1} * (\text{cost of bits/node})$$

The total cost, or the sum of the quantities calculated in steps 122 and 126, is calculated for the plurality of widths, via step 128. The width which results in the lowest total cost calculated in step 128 can then be selected using the step 116 of the method 110 shown in FIG. 4A.

For example, where two hundred items are desired to be stored and where a tree node costs thirty-six bits, we calculate:

Thus, the cost values are:

TABLE 2

| N | W | $EV_{nodes/leaf}$ | Bits/nodes | $EV_{nodes}$ | $C_{table}$ | $C_{trees}$ | $C_{total}$ |
|---|---|---|---|---|---|---|---|
| 200 | 6 | .694 | 36 | 138.7 | 384 | 4995 | 5379 |
| 200 | 8 | .305 | 36 | 61.03 | 2,048 | 2197 | 4245 |
| 200 | 10 | .091 | 36 | 18.24 | 10,240 | 657 | 10897 |
| 200 | 12 | .024 | 36 | 4.781 | 49,152 | 172 | 49,324 |

Thus, for storing 200 items with a tree cost of thirty-six bits per node, the width, W, of eight bits is the best of the four values considered.

Thus, using the methods depicted in 4A and 4B, a designer can select the width of the table which optimizes the cost. As a result, trial and error in selecting the width of the direct table can be avoided. At the same time, the cost in terms of memory for the direct table can be minimized to the extent possible for a given number of items to be stored.

Figure 5A:
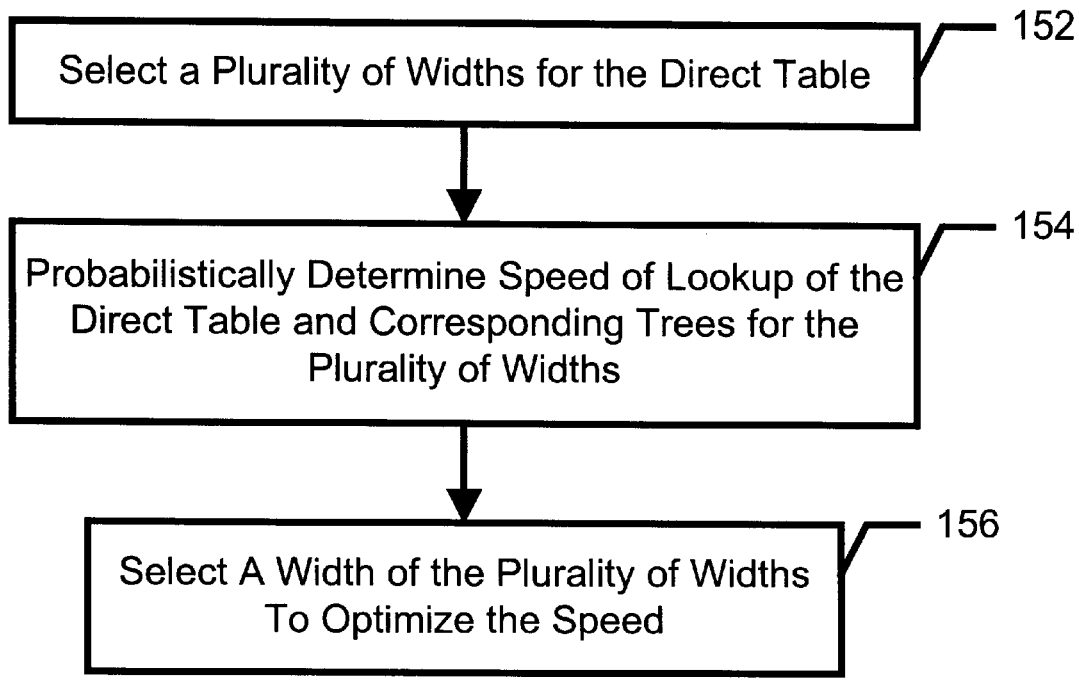
FIG. 5A is a flow chart depicting a method in accordance with the present invention for optimizing the speed of a direct table and the corresponding trees.

Another property in which a designer may be interested is the speed of a lookup for a direct table and corresponding trees. Consequently, FIG. 5A depicts a high-level flow chart of one embodiment of a method 150 in accordance with the present invention for optimizing the speed of a direct table without engaging in trial and error. A plurality of for the direct table is selected, via step 152. The speed of the direct table and the corresponding plurality of trees is calculated probabilistically for each or the plurality of widths, via step 154. In a preferred embodiment, the speed of the direct table and corresponding trees is calculated by determining a best case and a worst case for a lookup of an item. Either the best case or the worst case, or both, can then be used to determine the speed of the direct table and corresponding trees. In a preferred embodiment, both the best case and the worst case speeds are utilized. It should also be noted that the speed of the direct table and the corresponding trees is generally highly dependent upon the system used and the memory in which the direct table and corresponding trees are implemented. The width for the direct table which will produce the optimal, or minimum, speed is then selected, via step 156. Note that if the optimal width was not among the plurality of widths selected in step 152, then steps 152 and 154 may be repeated. Using the width selected in step 156, the direct table and corresponding trees having the optimal width can be determined. Once the width is selected using the step 156, the desired direct table and corresponding trees can be built.

Figure 5B:
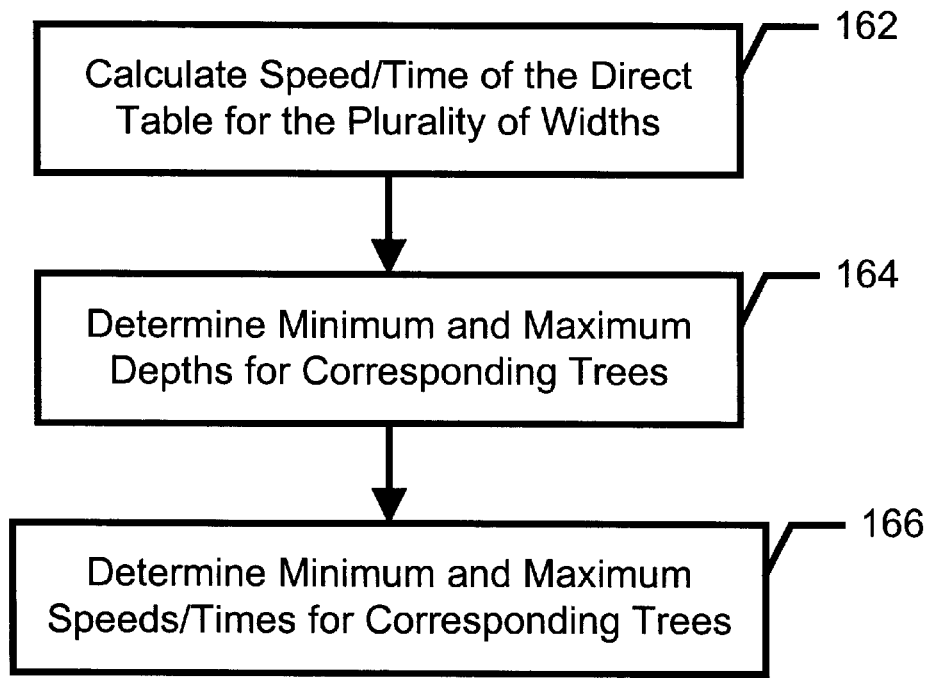
FIG. 5B is a more detailed flow chart depicting a method in accordance with the present invention for calculating the speed of a direct table and corresponding trees.

FIG. 5B depicts a more detailed flow chart of a method for performing the speed-calculating step 154 of the method 150 shown in FIG. 5A. Referring back to FIG. 5B, the speed of access for the direct table for the plurality of widths is determined, via step 162. Typically, the access speed of a direct table for a particular type of memory is independent of width and constant. The best and worst case times for the direct table are a single access time. Thus, step 162 generally includes determining the speed of a direct table for a particular type of memory. In a preferred embodiment, step

TABLE 1

| N | W | p (0) | p (1) | p (2) | p (3) | p (4) | p (5) | p (6) | p (7) | p (8) | p (9) | p (10) | p (11) |
|---|---|---|---|---|---|---|---|---|---|---|---|---|---|
| 200 | 6 | .044 | .138 | .216 | .225 | .175 | .108 | .056 | .024 | .009 | .003 | .001 | .000 |
| 200 | 8 | .459 | .358 | .139 | .036 | .007 | .001 | .000 | .000 | .000 | .000 | .000 | .000 |
| 200 | 10 | .823 | .160 | .015 | .001 | .000 | .000 | .000 | .000 | .000 | .000 | .000 | .000 |
| 200 | 12 | .953 | .046 | .001 | .000 | .000 | .000 | .000 | .000 | .000 | .000 | .000 | .000 |

162 includes determining the speed of the direct table for multiple memories, such as both internal and external memories. For example, in one direct table in a particular type of memory, the speed of access is ten cycles of 7.5 nanoseconds per cycle. Thus, the speed of access for such a direct table is seventy-five nanoseconds.

Figure 1:
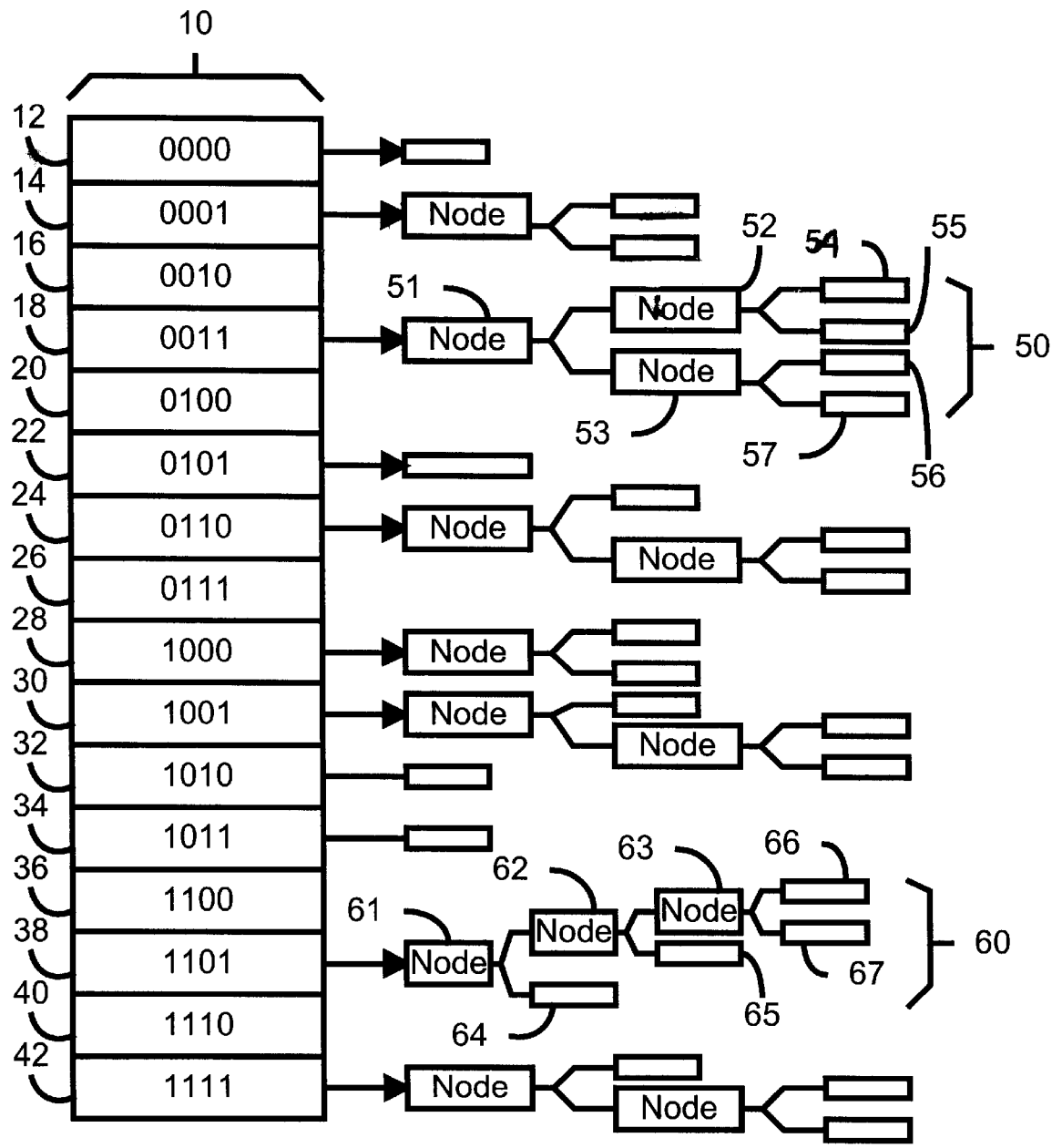
FIG. 1 is a diagram of a direct table and some corresponding trees.

The speed of access for the plurality of trees is then probabilistically determined, via steps 164 and 166. The speed of access for a tree depends upon the number of nodes which must be traversed when finding an item. Thus, the speed of access depends upon the depth, or number of nodes placed serially, of a tree. For example, referring back to FIG. 1, the trees 50 and 60 each have four leaves. However, the tree 50 has a depth of two because the tree is balanced and, therefore, two nodes, node 51 and either node 52 or node 53, are always traversed in order to locate and item corresponding to one of the leaves 54, 55, 56, and 57. However, the tree 60 has a depth of three. This is because up to three nodes, node 61, node 62 and node 63, may be traversed in order to locate an item corresponding to leaf 66 or 67. Note, however, that for the item corresponding to the node 64 only one node, node 61, is traversed.

Referring back to FIG. 5B, in order to determine the speed of access for a tree, the minimum and maximum depths of the corresponding trees are determined, via step 164. It can be shown that the depth, D, of a tree is less than or equal to the number of leaves (L) minus one (L−1) and greater than or equal to the base two logarithm of the number of leaves ($\log_2 L$). Thus, step 164 includes determining the quantities $\log_2 L$ and L−1. The minimum and maximum (best and worst case) access speeds are then determined, via step 166. Typically, a fixed time is taken to traverse a node of a tree for a given type of memory. The minimum time may thus be determined by multiplying the minimum depth, $\log_2 L$, by the time taken to traverse a single node. Similarly, the maximum time may be determined by multiplying the maximum depth, L−1, by the time taken to traverse a single node. For example, in one system for a particular type of memory, the time taken to traverse a node is seven cycles of 7.5 nanoseconds per cycle. Assuming that eight thousand items are to be stored, the number of leaves, L, is eight thousand. Thus, the minimum time is $\log_2(8000)*(7)*(7.5)$, or approximately six hundred and eighty nanoseconds. The maximum time is given by $(7999)*(7)*(7.5)$, or over four hundred and nineteen thousand nanoseconds.

Typically, the search time for a direct table in a particular type of physical memory is a constant. Therefore, making the direct table as large as possible (hence the expected tree size as small as possible) is the optimal strategy for speed. However, it can happen that making a direct table smaller than the largest possible size in external memory enables moving the direct table and corresponding trees into internal memory on a chip. The advantage of the higher internal memory speed might make design with a smaller direct table faster.

Based on the minimum and maximum times for the corresponding trees and direct table, the width of the direct table can be selected using the step 156 of the method 150 shown in FIG. 5A. In the example discussed above, it would appear that making the direct table as wide as possible, in other words storing as many items in the direct table as possible, would optimize the speed. However, as discussed above, the direct table and corresponding trees may be implemented in different memories. Some memories, particularly faster memories, may have limits on the width of the direct table. For example, making the direct table slightly less wide may allow a designer to move the direct table alone or both the direct table and the corresponding trees into a memory which allows for higher speeds. Thus, a careful comparison of the speeds obtained in steps 162 and 166 of the method depicted in FIG. 5B should be performed in order to provide the optimal speed. Once the width is selected, using the step 156 of the method 150 depicted in FIG. 5A, the desired direct table and corresponding trees can be built.

Thus, using the methods 100, 110, and 150 or some combination thereof, the properties of the direct table and corresponding trees can be optimized for the desired characteristics. Because the desired properties are calculated probabilistically, the methods 100, 110 and 150 are less time consuming and may result in better performance than simple trial and error.

A method and system has been disclosed for better selecting the width of a direct table and, therefore, determining the corresponding trees. Software written according to the present invention is to be stored in some form of computer-readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for selecting a direct table and a plurality of corresponding trees in a computer system, the method comprising the steps of:

(a) selecting a plurality of widths for the direct table;

(b) probabilistically determining at least one desired property of the direct table and the plurality of corresponding trees for the plurality of widths, the at least one desired property is a total cost of the direct table and the plurality of corresponding trees, wherein the probabilistically determining the at least one property step (b) further includes the steps of:

(b1) determining an expected value of a number of tree nodes of the corresponding trees for the plurality of widths; and (b2) determining the sum of the cost of the direct table and the plurality of corresponding trees utilizing the expected value; and (c) selecting a width of the plurality widths for the direct table and the plurality of corresponding trees based on the at least one desired property of the direct table and the plurality of corresponding trees, the width selecting step further including the step of (c1) selecting the width for the direct table to minimize the total cost of a direct table and the plurality corresponding trees.

2. The method of claim 1 wherein the sum determining step (b2) further includes the step of:

(b2i) determining a first number of bits in the direct table utilizing the plurality of widths of the direct table;

(b2ii) for the plurality of widths, determining a second number of bits in the plurality of corresponding trees by multiplying the expected value by a third number of bits per node for the plurality of corresponding trees; and (b2iii) adding the first number of bits to the second number of bits to determine the sum of the cost of the direct table and the plurality of corresponding trees for the plurality of widths.

3. The method of claim 2 wherein selecting step (c1) further includes the step of:
(c1i) selecting the width for the direct table which results in the smallest sum of the cost of the direct table and the plurality of corresponding trees.

4. A method for selecting a direct table and a plurality of corresponding trees in a computer system, the method comprising the steps of:
(a) selecting a plurality of widths for the direct table;
(b) probabilistically determining at least one desired property of the direct table and the plurality of corresponding trees for the plurality of widths, the at least one desired property is a speed of lookup for the direct table and the plurality of corresponding trees, wherein probabilistically determining the at least one property step (b) further includes the step of:
(b1) for the plurality of widths, probabilistically determining a minimum possible depth and a maximum possible depth for the plurality of trees utilizing a number of items; and
(c) selecting a width of the plurality widths for the direct table and the plurality of corresponding trees based on the at least one desired property of the direct table and the plurality of corresponding trees, the width selecting step (c) further including the step of
(c1) selecting the width for the direct table to minimize the speed of lookup for the direct table and the plurality of corresponding trees.

5. The method of claim 4 wherein the minimum possible depth is $\log_2$(the number of items).

6. The method of claim 5 wherein the maximum possible depth is the number of items minus one. of corresponding trees, the width selecting step (c) further including the step of (cI) selecting the width for the direct table to minimize the speed of lookup for the direct table and the plurality of corresponding trees.

7. The method of claim 1 or 4 wherein the probabilistically determining the at least one property step (b) further includes the step of:
(b) probabilistically determining the at least one property using a spreadsheet.

8. A system for searching for a plurality of items comprising:
a direct table having a width; and
the plurality of corresponding trees for the direct table;
the width being selected form a plurality of widths by probabilistically determining at least one desired property of the direct table and a plurality of corresponding trees for the plurality of widths and selecting the width for the direct table and the plurality of corresponding trees based on the at least one desired property of the direct table and the plurality of corresponding trees;
wherein the at least one desired property is a total cost of the direct table and the plurality of corresponding trees and wherein the width for the direct table is selected to minimize the total cost of a direct table and the plurality of corresponding trees
wherein the at least on property is probabilistically determined by determining an expected value of a number of tree nodes of the corresponding trees for the plurality of widths and determining the sum of the cost of the direct table and the plurality of corresponding trees utilizing the expected value.

9. The system of claim 8 wherein the sum is determined by determining a first number of bits in the direct table utilizing each of the plurality of widths of the direct table, determining a second number of bits in the plurality of corresponding trees for each of the plurality of widths by multiplying the expected value by a third number of bits per node for the plurality of corresponding trees, and by adding the first number of bits to the second number of bits to determine the sum of the cost of the direct table and the plurality of corresponding trees for each of the plurality of widths.

10. The system of claim 9 wherein the width is selected by selecting the width of the plurality of widths which results in the smallest sum of the cost of the direct table and the plurality of corresponding trees.

11. A system for searching for a plurality of items comprising:
a direct table having a width; and
the plurality of corresponding trees for the direct table;
the width being selected form a plurality of widths by probabilistically determining at least one desired property of the direct table and a plurality of corresponding trees for the plurality of widths and selecting the width for the direct table and the plurality of corresponding trees based on the at least one desired property of the direct table and the plurality of corresponding trees;
wherein the at least one desired property is a speed of lookup for the direct table and the plurality of corresponding trees and wherein the width is further selected by selecting the width of the plurality of widths that minimizes the speed of the lookup for the direct table and the plurality of corresponding trees;
wherein the at least one property is determined by probabilistically determining a minimum possible depth and a maximum possible depth for the plurality of trees utilizing a number of items.

12. The system of claim 11 wherein the minimum possible depth is $\log_2$(the number of items).

13. The system of claim 12 wherein the maximum possible depth is the number of items minus one.

14. The system of claim 8 or 11 wherein the at least one property is determined by probabilistically determining the at least one property using a spreadsheet.

* * * * *